(12) United States Patent
Selkee

(10) Patent No.: US 6,461,017 B2
(45) Date of Patent: *Oct. 8, 2002

(54) MARKER LIGHT

(76) Inventor: Tom V. Selkee, 1434 N. Mills Ave., Claremont, CA (US) 91711

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/444,222

(22) Filed: Nov. 19, 1999

(65) Prior Publication Data

US 2002/0003700 A1 Jan. 10, 2002

(51) Int. Cl.[7] ................................................ F21V 21/00

(52) U.S. Cl. ..................... 362/249; 362/294; 362/545; 362/189; 362/547; 362/473; 362/474

(58) Field of Search .................. 362/294, 249, 362/248, 545, 547, 800, 189, 186, 185, 267, 390, 369, 474, 473

(56) References Cited

U.S. PATENT DOCUMENTS

| 4,112,485 A |   | 9/1978  | Sutter |
|---|---|---|---|
| 4,211,955 A |   | 7/1980  | Ray |
| 4,277,819 A |   | 7/1981  | Sobota et al. |
| 5,038,255 A | * | 8/1991  | Nishihashi et al. ........... 362/61 |
| 5,546,681 A | * | 8/1996  | Goldston et al. ............. 36/137 |
| 5,752,766 A | * | 5/1998  | Bailey et al. ................ 362/250 |
| 5,848,839 A | * | 12/1998 | Savage, Jr. .................. 362/267 |

* cited by examiner

Primary Examiner—Sandra O'Shea
Assistant Examiner—Ali Alavi
(74) Attorney, Agent, or Firm—Boniard I. Brown

(57) ABSTRACT

A flexible liquid tight marker light that comprises a light source encapsulated by injection molding a light transmitting elastomeric polymer to form a protective casing which further includes an imbedded wiring harness electrically connected to said light source and imbedded structural members that protect the light source from excessive flexing and impacts. The wiring harness and structural members provide heat sink means for the light source. The casing is comprised of variable durometer tinted polyurethane elastomers with light diffusing pigments added. Diverging optics are molded into the casing outer surface.

24 Claims, 5 Drawing Sheets

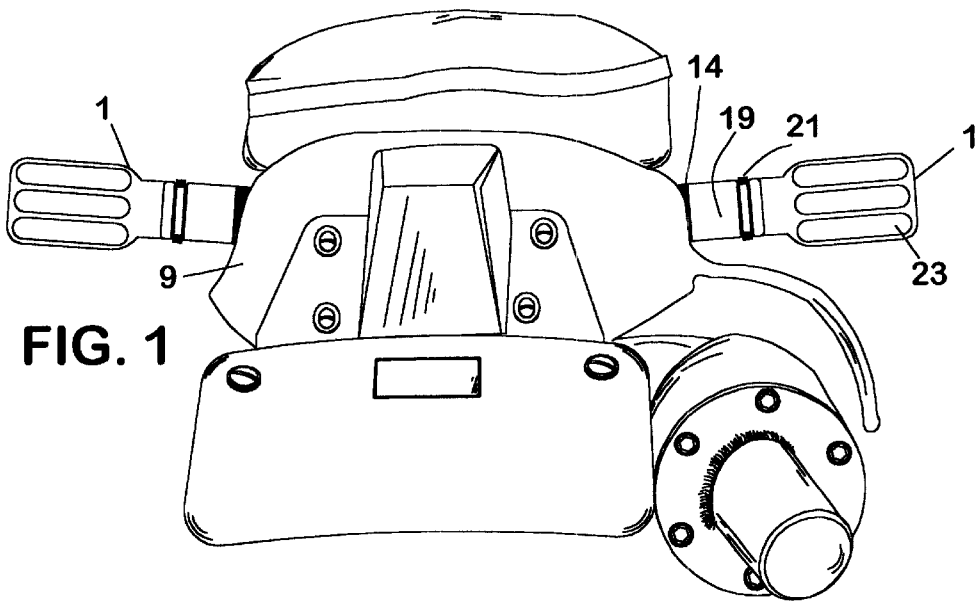
FIG. 1
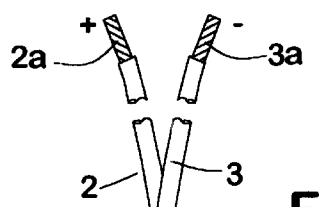
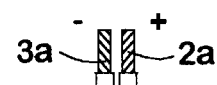
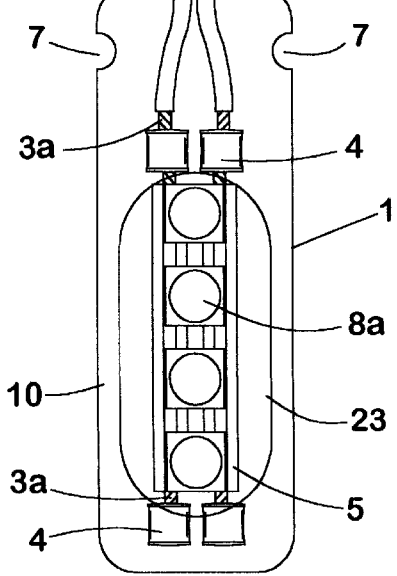
FIG. 2
FIG. 3

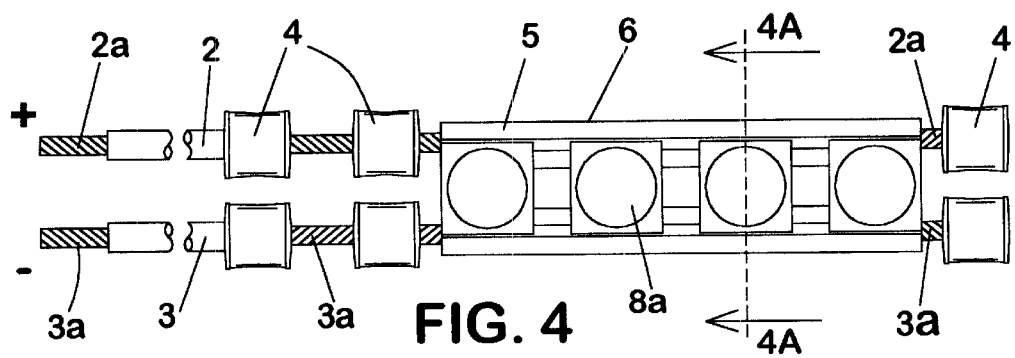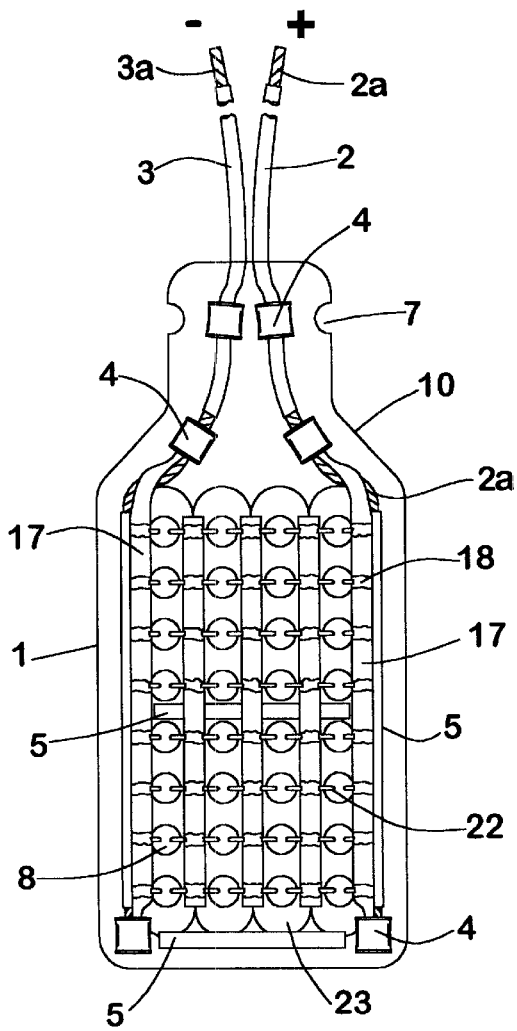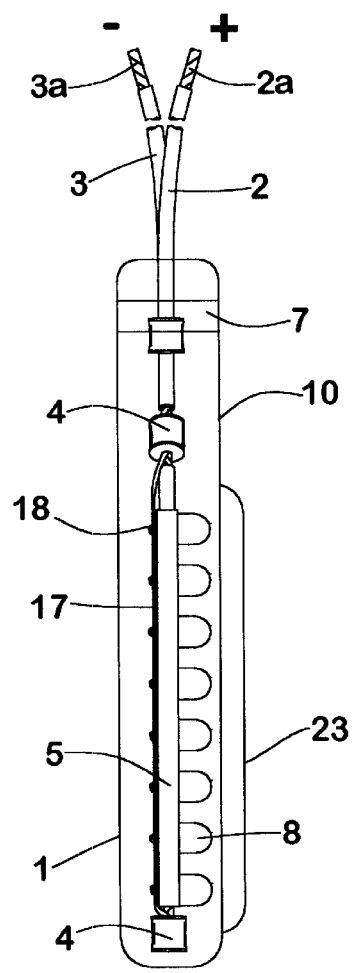

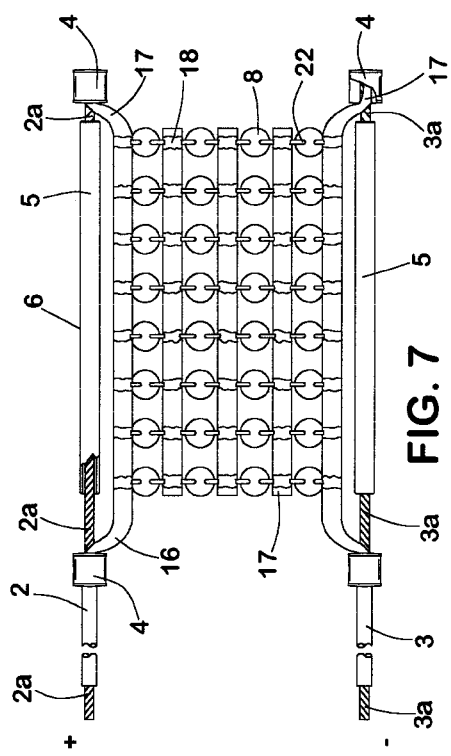
FIG. 7
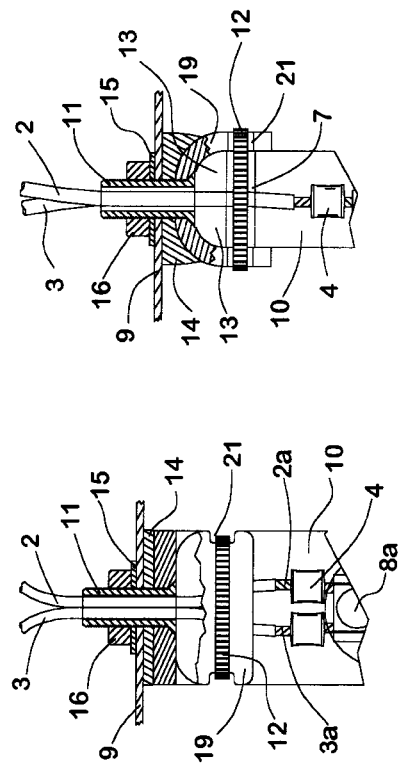
FIG. 9
FIG. 8

MARKER LIGHT

FIELD OF THE INVENTION

This invention is directed to marker lights, and more particularly to light emitting diode type marker lights that are flexible and liquid tight and are resistant to damage caused impacts, abrasion or exposure to extreme environmental elements.

BACKGROUND OF THE INVENTION

This invention generally relates to impact and shock resistant marker lights comprising encapsulated light sources. Marker lights used in applications such as off road vehicles are subjected to extreme abuse such as vibration created by traversing rough terrain and direct exposure to the elements such as rain, mud and dust plus an occasional impact with a tree branch or a vehicle crash. In particular, it relates to such lights wherein one or more light emitting diode (LED) light sources and a structural protective member with an integral wiring harness surrounding the LED's are encapsulated by injection molding a transparent or semi-opaque thermoplastic elastomeric resin casing around them.

Description of the Prior Art

Marker lights currently utilize short life span incandescent bulbs as the primary means for producing light. Incandescent bulbs require high wattage for operation due to their inefficient nature of energy to light conversion as most energy ends up as waste heat. Most incandescent type marker lights have a removable lens to allow bulb replacement and thus are not sealed to be completely water, dust or mud proof Marker lights with incandescent filament type bulbs exhibit a reduction in bulb life when exposed to vibration, water and impacts encountered during off road use. Filament lamps have many drawbacks such as high power consumption, generating large amount of heat and filament breakage, the lamps per se being large and heavy. Existing marker light housings are constructed of semi-rigid plastics which are not inherently flexible, have low izod impact strengths and thus demonstrate a propensity to substain permanent damage during impacts. Incandescent type marker lights are also large and bulky due to the inner housing design which generally utilizes a metal carrier to hold the hot bulb and act as heat sink while also providing a means for bulb retention and replacement. The metal carrier that secures the bulb has a tendency to corrode over time due to water condensation in the bulb housing. The corroded electrical contacts of the metal carrier can produce a degraded intermittent light circuit connection or a possible open circuit. Incandescent marker lights usually have a separate transparent tinted lens assembly surrounding the incandescent bulb that is molded from low impact resistant styrene, polycarbonate or acrylic and thus is fragile and breaks easily when subjected to impacts. Therefore it would be beneficial to have an improved marker light without the problems described.

SUMMARY OF THE INVENTION

The purpose of the present invention is to provide a zero maintenance marker light of the aforesaid type that is impact, shock, and abrasion resistant while also increasing the overall marker light operational life, while reducing weight and power requirements. The marker light design must be producible utilizing high volume production methods such as injection molding, wave soldering and press-work operations. This purpose is met by this invention, which is characterized by the fact that the marker light casing is injection molded utilizing a tough elastomeric plastic polymer that is molded around the LED's, the LED protective structure and LED wiring harness such that the marker light constitutes a non-dismountable whole. This results in a completely liquid tight encapsulation with combined electrical insulation and resistance to extreme mechanical stresses such as impacts, vibration and abrasions. Since the light output of an LED is a reduced by high humidity, the complete embedment of the LED by a thermoplastic elastomer prevents moisture ingress. The LED's with their attached flexible wiring harness and protective structure are insert injection molded around a flexible thermoplastic elastomer The flexible composite assembly created, allows the thermoplastic elastomer casing to attenuate energy during impacts without affecting the LED's or their associated electrical connections. The marker light casing is composed of highly abrasion resistant elastomeric polymers that do not mar or scratch easily and readily retain their initial shape after impacts. The LED's used in the marker light are classified as solid state semiconductor devices that have a mean time between failure of approximately 100,000 hours and are not damaged by vibration or shock loads. For added attractiveness and appeal, the thermoplastic elastomer casing can be molded using any semi-opaque color scheme provided it meets optical requirements of SAE J576. The semi-opaque colored casing diffuses the intense focused LED light, increasing the viewing angle and lowering the on axis LED intensity producing a more homogenous and uniform light distribution. The marker light output can also be further enhanced by molding a lens into the casing to diverge the LED light output to produce a marker light high in luminance and wide in viewing while eliminating glare complaints and reducing the number of light emitting diodes required. The LED's used in the marker light are very efficient devices as they operate on approximately 20 percent of the power required by incandescent bulbs. Vehicle weight is a major design consideration for on-off highway vehicles. Lower weight vehicles have better maneuverability and operator control plus reduced energy consumption and increased vehicle performance. A vehicle's alternator power output can be reduced using LED lighting technology thus reducing overall vehicle weight. When LED based marker lights are used as emergency flashers utilizing only battery power, the operation time can be increased from two to four times over incandescent lighting technology. This feature provides a safety improvement as well as reducing the likelihood of a dead battery. LED's are solid state devices so they turn on and off in tens of nanoseconds compared to about 200 milliseconds for an incandescent bulb. This provides the end user a safer signalling device that turns on approximately one car length quicker at highway speeds. Other details and advantages of the present invention will become apparent as the following description of the presently preferred embodiments of practicing the invention proceeds.

BRIEF DESCRIPTION OF THE DRAWINGS

FIG. 1 is a front view an embodiment of a marker light mounted as a signal device on the rear section of a motorcycle;

FIG. 2 is a front view of a marker light constructed in accordance with the present invention;

FIG. 3 is a side view of the marker light of FIG. 2;

FIG. 4 is a front view of a marker light wiring harness constructed in accordance with the present invention;

FIG. 5 is a rear view of a second embodiment of a marker light constructed in accordance with the present invention;

FIG. 6 is a side view of the marker light of FIG. 5;

FIG. 7 is a rear view of the marker light wiring harness of FIG. 5 constructed in accordance with the present invention;

FIG. 8 is a front partial sectional view of a marker light mounted to a vehicle body;

FIG. 9 is a side partial sectional view of the marker light of FIG. 8;

DETAILED DESCRIPTION OF THE INVENTION

Figure 4A:
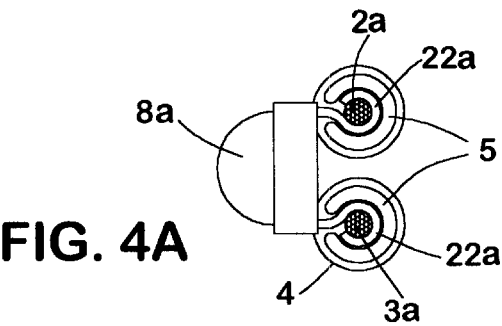
FIG. 4A is a cross-sectional view taken at line 4A—4A of FIG. 4.
Figure 10:
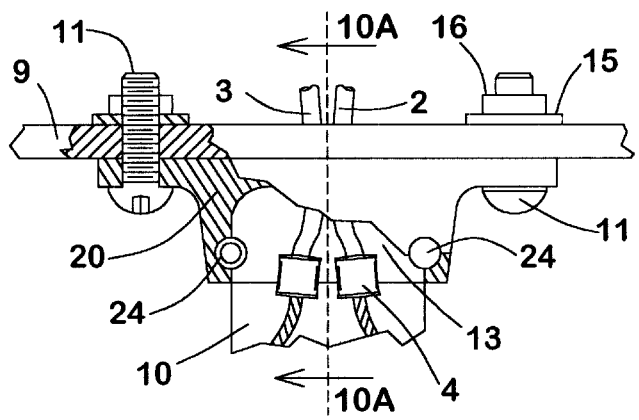
FIG. 10 is a rear view, partially In section, of a second embodiment of a marker light mounted to a vehicle body.
Figure 10A:
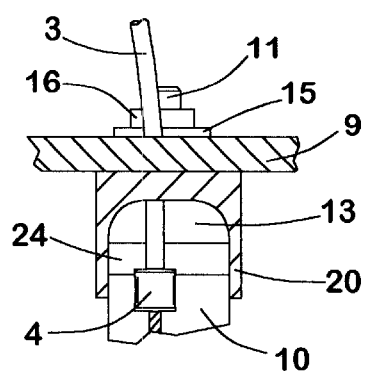
FIG. 10A is a side sectional view taken at line 10A—10A in FIG. 10.
Figure 11:
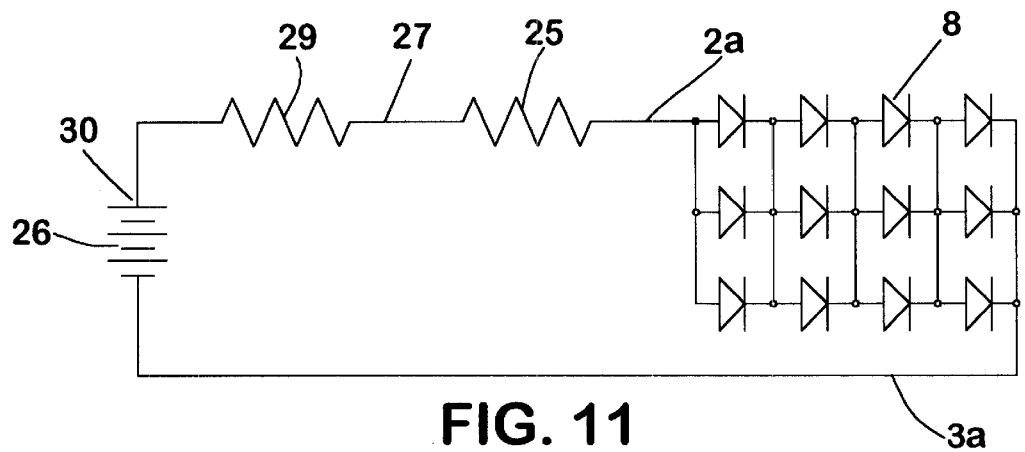
FIG. 11 is a schematic diagram of the marker light wiring harness depicted in FIG. 7.
Figure 12:
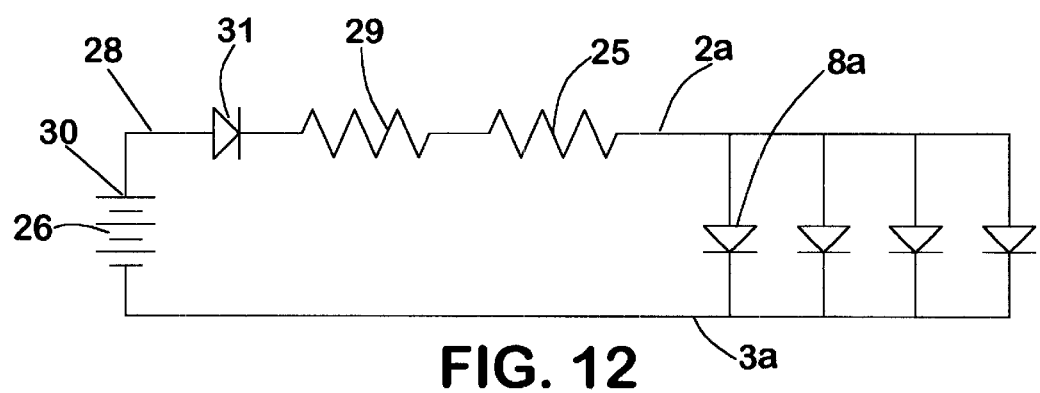
FIG. 12 is a schematic diagram of the marker light wiring harness depicted in FIG. 4.

The marker light 1 consists of LED's 8, 8a connected to a flexible wiring harness assembly 6 that is insert molded into an injection molded thermoplastic elastomeric case 10, comprising a plurality of injection moldable elastomers ranging in durometer from shore 60A to 80D, with integral molded-in lenses 23 for light divergence. The wiring harness assembly 6 includes a pair of laterally spaced-apart, opposite chargeable, abrasion resistant, high tensile strength, nylon coated, multi-stranded stainless steel cables 2 and 3 that run longitudinally to the injection molded thermoplastic elastomeric case 10. The cables 2, 3 have uninsulated stripped cable portions 2a and 3a which act as terminals for conduction of electricity. The stripped cable portion 2a is a positive conductor and the stripped cable portion 3a is a negative conductor. Stripped cables 2a, 3a have crimped-on generally cylindrical cable stops 4 that act as a strain relief to prevent cable 2, 3 movement under tension loading and cable 2, 3 pullout during extreme case 10 flexure and act as locational guides and tie down points during the insert injection molding process. The cable stops 4 can be made from a malleable medium strength material such as copper or aluminum. The cable stop 4 can be used as an electrical terminal connection to transmit electricity from the stripped cable portion 2a, 3a to a flat braided copper LED connection strip 17 when the cable stop 4 is crimped around both the flat braided copper LED connection strip 17 and stripped cable portion 2a, 3a forming a permanent interference fit electrical termination as shown in FIG. 7. The LED's 8, 8a are electrically connected together in series or parallel to form an array using either crimp type connections or wave soldering techniques depending on the type of LED 8 ,8a used. The flat braided copper LED connection strip 17 is attached to the LED terminal leads 22 by solder joints 18. Snap LED's 8a manufactured by Hewlett Packard, have large deformable wing type terminal leads 22a that can be crimp formed around the stripped cable 2a,3a forming an interference fit as shown in FIG. 4A. Thermal and electrically conductive epoxy or silicone adhesive (not shown) may be placed between the wing type terminal leads 22a and stripped cables 2a, 3a for enhanced electrical conductivity, heat transfer characteristics and joint reliability. The wiring harness assembly 6 is designed to be a thermal heat sink for the LED terminal leads 22, 22a to maximize heat transfer from the LEDs 8, 8a. An ideal drive circuit will provide the same current to the LED's 8, 8a regardless of ambient temperatures and power source 26 voltage variances. To balance circuit cost and complexity, the series LED drive circuit 27 consists of a current limiting resistor 25 and a positive temperature coefficient resistor (PTC) 29. In the series LED drive circuit 27, the input current to the LED's 8 varies as the power source 26 positive input voltage 30 deviates. Current control characteristics improve as the current limiting resistor 25 increases in value and fewer LED's 8 are used in series. For Vehicle applications, where battery voltage is approximately 13 volts, four LED's 8 in series is a good compromise between current control, heat generation and minimum turn on voltage. Temperature compensation is achieved by incorporating a PTC resistor 29 in the series LED drive circuit 27 so when ambient temperatures increase, the forward current to the LED's 8 decreases. This allows the LED's 8 to be driven at a higher forward current by reducing the amount of current derating. Battery powered marker lights 1 for mountain bikes require a low voltage battery power (1.5–3 volts DC) source. The low voltage parallel LED drive circuit 28 consists of a power source 26, current limiting resistor 25, a PTC resistor 29 and a silicon diode 31 for reverse voltage protection in series with the LED's 8a. The current limiting resistor 25 and PTC resistor 29 should be located away from the LED's 8, 8a to prevent thermal problems. In the series LED drive circuit 27 and the parallel LED drive circuit 28 proper thermal management techniques and drive current selection are critical to maximize the light output of the LED's 8, 8a.

Protecting and adding structural integrity to the case 10 surrounding the LED's 8, 8a between two of the cable stops 4 and located around each stripped cable portion 2a, 3a is a roll formed tube 5 formed of steel The roll formed tubes 5 act as structural members to protect the LED's 8, 8a by preventing excessive case 10 flexure and deformation in the area where the LEDs 8, 8a are imbedded in the thermoplastic elastomeric case 10. Large LED 8, 8a light arrays may include roll formed tubes 5 running perpendicular to each other for additional structural support. There are many methods to electrically connect and structurally protect the LED's 8, 8a and these are but two examples that maximize the thermoplastic shot size used to mold the case 10 while minimizing the insert molded wiring harness volume to obtain high impact energy absorption characteristics while minimizing the marker light 1 weight. The wiring harness 6 is coated with adhesives (not shown) to provide an interlocking bond between the adhesives and the thermoplastic elastomer during insert molding. The adhesive to thermoplastic elastomer bond prevents the wiring harness 6 from microscopically separating from the thermoplastic elastomer during case 10 flexure. This improves the overall marker light 1 structural dynamics by elimination or reduction of fatigue at contact points. Shock loads are more uniformly distributed over the entire wiring harness 6 thus making the marker light 1 less susceptible to sudden damaging loads The adhesive layer also adds cushioning and creates an additional protective moisture barrier between the LED's 8, 8a and the case 10. A two part adhesive system utilized to provide rubber tearing bonds and outstanding environmental resistance are Chemlock 219 and 213 manufactured by Lord Chemical Products. Chemlock 219 can be used as a primer for Chemlok 213 adhesive as their properties are complementary. When using a two coat system, optimum bond performance requires pre-baking of the wiring harness 6 before insert molding. Pre-bake can be as long as 16 hours at 250 F or as high as 325 for 2 hours when used with 219 as a primer. But it should be appreciated that the operating parameters of the method for each system should be adjusted empirically to optimize the overall marker light 1 performance. The case 10 can be molded from polyether or polyester based thermoplastic polyurethanes (TPU) with polyester based TPU's offering excellent toughness and resistance to oils and chemicals while polyether based TPU's offer excellent flexibility, hydrolytic stability and low temperature properties. Multi-shot injection molding techniques allow different durometer resins to be utilized in combinations to form a variable durometer case 10 that has areas differing in hardness and flexibility to optimize LED 8, 8a protection while allowing increased flexure in areas designed to absorb impact energy. Common TPU's that can be used include Pellethane by Dow Chemical, Texin by Bayer Plastics or Estane by B. F. Goodrich. Pellethane thermoplastic elastomers are the preferred polymers for vehicle lighting applications due to their balance of chemical/oil resistance, ultraviolet light protection, toughness over temperature extremes, ease of processing and refractive indexes that are similar to traditional lens materials such as polycarbonate. The thermoplastic elastomers are injection molded at temperatures lower than the thermal distortion temperature of the LED's 8, 8a. Injection molding process parameters are dependent on mold design and the type of injection molding process used and thus must be optimized for each application. The thermoplastic elastomer case 10 can be molded from pigmented and tinted TPU's that diffuse the intense focused LED 8, 8a light, producing a wider viewing angle and a more uniform light distribution while also producing a marker light 1 that matches the color of the vehicle. Complete light attenuation on one side of the case10 can be achieved by adding a substantial amount of pigments. The LED 8, 8a radiation pattern can be directed with tenses 23 molded into the case 10 to provide a uniform light output over wide viewing angles. Lens 23 types such as pillow, fresnel and convex can be molded into the case 10 to provide diverging optics. A marker light 1 mounting method that allows disengagement of the marker light 1 from the vehicle body 9 during impingement with another structure is desired. Two molded in, oppositely opposed, semi-circular notches 7 located near the case 10 extremity where the cables 2, 3 exit, are utilized to secure the case 10 to the socket 13 when the case is installed in the U-shaped member 19 or case mount 20. Spring pins 24 are installed in the case mount 20 to form crenulations inside the socket 13 to capture and hold the case 10. The case 10, due to its deformable elastomeric material properties, can be press fit by hand into the socket 13 and is thus retained by the interference created by the spring pin 24 projection and the semi-circular notches 7 in the case 10. In an alternate form, the case 10 is disposed into the socket 13 of a U-shaped member 19 and is fastened by a nylon tie wrap 12 that girds around the U-shaped member notches 21 and over the semi-circular notches7 to secure the case 10 to the U-shaped member 19. A compressible foam pad 14 is adhesively attached to the back of the U-shaped member 19 to provide cushioning and conformance to an irregular shaped vehicle body 9. The case mount 20 and U-shaped member 19 are fastened to a vehicle body 9 utilizing common fastening methods such as screws 11, washers 15 and nuts 16. The U-shaped member 19 is preferably stamped and formed using common pressworking techniques and due to product weight being a major design constraint, aluminum is the material of choice. The case mount 20 is designed to be more attractive in appearance and thus can be produced from aluminum using die casting methods or be injection molded from a high impact strength, glass filled, reinforced plastic. It is to be understood that various changes and modifications may be made from the preferred embodiments discussed above without departing from the scope of the present invention, which is established by the following claims and equivalents thereof.

What is claimed is:

1. A lamp comprising:
an elastomeric body,
a plurality of light-emitting diodes embedded in said body,
a plurality of elongated electroconductive elements interconnecting the light-emitting diodes,
at least one substantially rigid means adjacent to at least certain ones of said light-emitting diodes to shield the diodes against damaging impact and bending loads, and
an electrical power source connected with said electroconductive elements to energize said light-emitting diodes.

2. A lamp according to claim 1, wherein:
said electroconductive elements comprise heat sink means for heat generated by the light-emitting diodes.

3. A lamp according to claim 1, wherein:
said elongated electroconductive elements comprise a harness which conducts heat from the light-emitting diodes generated by the diodes.

4. A lamp according to claim 1, wherein:
at least one outer surface portion of said elastomeric body is configured to define at least one diverging lens.

5. A lamp according to claim 1, wherein:
said elastomeric body comprises at least one injection molded polyurethane elastomer ranging in durometer from 60A to 80 D.

6. A lamp according to claim 1, wherein:
said electrical power source comprises at least one positive and one negative electrical conductor extending from said elastomeric body.

7. A lamp according to claim 1, and further comprising:
at least one electrical conductor extending outwardly of the elastomeric body and adapted to support the elastomeric body after impact forces eliminate other substantial support for said body.

8. A lamp according to claim 1, and further comprising:
insulated metal cables connecting said electrical power source with at least one strain relief means having a body portion fixedly attached within said elastomeric body to transfer significant forces acting on said cables to said elastomeric body to prevent separation of said cables from said elongated electroconductive elements.

9. A lamp according to claim 1, wherein:
said elastomeric body comprises a substantially rigid elongate structural member embedded in said elastomeric body.

10. A lamp comprising:
a molded elastomeric polymer body,
a plurality of light-emitting diodes embedded within the body,
a plurality of electroconductive elements in said body and interconnecting said light emitting diodes, said electroconductive elements providing a heat sink for heat generated by said light-emitting diodes,
at least one substantially rigid portion of said elastomeric body adjacent to at least certain ones of said light-emitting diodes to shield the diodes and electroconductive elements against damaging impact and bending loads, and an electrical power source connected with said electroconductive elements to energize said light-emitting diodes.

11. A lamp according to claim 10, and further comprising:
at least one elongate rigid structural member embedded in said elastomeric polymer body.

12. A lamp according to claim 10, wherein:
said elastomeric polymer body comprises at least one injection moldable polyurethane elastomer ranging in durometer from shore 60A to 80D.

13. A lamp according to claim 10, and further comprising:
insulated metal cables connecting said electrical power source with at least one strain relief means having a body portion fixedly attached within said polymer body to transfer significant forces acting on said cables to said polymer body to prevent separation of said cables from said electroconductive elements.

14. A lamp according to claim 10, and further comprising:
at least one electrical connection extending outwardly of said polymer body and adapted to support said polymer body after impact forces eliminate substantial support for said body.

15. A lamp according to claim 10, wherein:
said electrical power source comprises at least one positive and one negative electrical conductor extending from said polymer body.

16. A lamp according to claim 10, wherein:
at least one outer surface portion of said polymer body is configured to define at least one diverging lens.

17. A lamp according to claim 10, and further comprising:
a mounting bracket having a body mount member defining an open recess, an end of said polymer body being closely mounted in said recess, said mounting bracket including a releasable mounting bracket member attached to said polymer body and having means for securely attaching said mounting bracket to an external member.

18. A lamp comprising:
a polymer body comprising substantially discrete portions of different durometer materials,
said polymer body having a first inner core portion comprising substantially rigid thermoplastic material and a second outer portion disposed about said first inner core portion and comprised of thermoplastic elastomeric material of different durometer,
a plurality of light-emitting diodes embedded in said body first inner portion,
a plurality of elongated electroconductive elements interconnecting the light-emitting diodes,
electrical input conductors extending into said body and providing heat sink means for heat generated by the light-emitting diodes, and
an electrical power source connected with said electroconductive elements to energize said light-emitting diodes.

19. A lamp according to claim 18, wherein:
said polymer body comprises a plurality of injection moldable elastomers ranging in durometer from shore 60A to 80D.

20. A lamp according to claim 18, and further including:
electrical power insulating metal cables connected with at least one strain relief having a body portion fixedly attached to said cables within said polymer body to transfer significant forces acting on said cables to said polymer body to prevent separation of said cables from said elongated electroconductive elements.

21. A lamp according to claim 18, and further comprising:
at least one electrical connection extending outwardly of said polymer body and adapted to support said polymer body after impact forces eliminate substantial support for said polymer body.

22. A lamp according to claim 18, wherein:
said electrical power source comprises at least one positive and one negative electrical conductor extending from said polymer body.

23. A lamp according to claim 19, wherein:
at least one outer surface portion of said polymer body is configured to define at least one diverging lens.

24. A lamp according to claim 19, and further comprising:
a mounting bracket defining an open recess, said polymer body being mounted in said recess,
said mounting bracket including a releasable mounting bracket member attached to said polymer body, and
means for securely attaching said mounting bracket to an external member.

* * * * *